United States Patent
Tracy et al.

(10) Patent No.: US 6,779,252 B2
(45) Date of Patent: Aug. 24, 2004

(54) APPARATUS FOR ASSEMBLING COMPONENTS

(75) Inventors: Joseph Patrick Tracy, South Haven, MN (US); Mark T. Girard, South Haven, MN (US); Ryan A. Jurgenson, Hutchinson, MN (US); Roger Rhea Livermore, Hutchinson, MN (US); David Richard Swift, Glencoe, MN (US)

(73) Assignee: Applied Kinetics, Inc., Hutchinson, MN (US)

( * ) Notice: Subject to any disclaimer, the term of this patent is extended or adjusted under 35 U.S.C. 154(b) by 187 days.

(21) Appl. No.: 09/883,629

(22) Filed: Jun. 18, 2001

(65) Prior Publication Data

US 2001/0034936 A1 Nov. 1, 2001

Related U.S. Application Data

(62) Division of application No. 09/250,823, filed on Feb. 17, 1999, now Pat. No. 6,266,869.

(51) Int. Cl.[7] .................................................. B23P 19/00
(52) U.S. Cl. ......................... 29/739; 29/603.03; 29/720; 29/721; 29/729; 29/833; 29/760
(58) Field of Search .......................... 29/739, 743, 729, 29/33 L, 759, 760, 829, 833, 720, 721, 603.03; 427/10, 96; 361/685, 727, 759; 901/16, 30

(56) References Cited

U.S. PATENT DOCUMENTS

| | | | |
|---|---|---|---|
| 4,866,836 A | 9/1989 | Von Brandt et al. | |
| 4,935,261 A | * 6/1990 | Srivastava et al. | ............ 427/10 |
| 4,980,783 A | 12/1990 | Moir et al. | |
| 5,155,904 A | 10/1992 | Majd | |
| 5,172,468 A | 12/1992 | Tanaka et al. | |
| 5,198,945 A | 3/1993 | Blaeser et al. | |
| 5,198,948 A | 3/1993 | Stover et al. | |
| 5,249,356 A | 10/1993 | Okuda et al. | |
| 5,282,102 A | 1/1994 | Christianson | |
| 5,371,939 A | 12/1994 | Ressmeyer et al. | |
| 5,383,270 A | 1/1995 | Iwatsuka et al. | |
| 5,391,842 A | 2/1995 | Bennin et al. | |

(List continued on next page.)

FOREIGN PATENT DOCUMENTS

| | | | |
|---|---|---|---|
| JP | 1-253295 | * 10/1989 | .................. 29/739 |
| JP | 3-47940 | 2/1991 | |
| WO | WO 01/23133 | 4/2001 | |
| WO | WO 01/71437 | 9/2001 | |

*Primary Examiner*—Minh Trinh
(74) *Attorney, Agent, or Firm*—Kagan Binder, PLLC

(57) ABSTRACT

The present invention provides an assembly apparatus employing at least a robotic or automated assembly apparatus to manipulate the components to be assembled and at least a first vision alignment system to align the components prior to their assembly. An adhesive dispense system is provided to connect, attach or otherwise adhere the components together. In a method in accord with the present invention for assembling components, a source of the components is provided is located relative to a global reference system. The components held by the source are then located relative to the global reference system based upon the determined location of the source. An adhesive is dispensed onto a first of the components and a second component is manipulated into an initial attachment position relative to the first component. The components are imaged by a local imaging system to establish their position relative to each other and the second component is moved into a desired attachment position and then moved into engagement with the adhesive and the first component. The adhesive may then be at least partially cured if desired.

11 Claims, 5 Drawing Sheets

U.S. PATENT DOCUMENTS

| | | |
|---|---|---|
| 5,473,488 A | 12/1995 | Gustafson et al. |
| 5,491,597 A | 2/1996 | Bennin et al. |
| 5,547,082 A | 8/1996 | Royer et al. |
| 5,608,590 A | 3/1997 | Ziegler et al. |
| 5,636,089 A | 6/1997 | Jurgenson et al. |
| 5,645,735 A | 7/1997 | Bennin et al. |
| 5,661,619 A | 8/1997 | Goss |
| 5,682,780 A | 11/1997 | Girard |
| 5,729,889 A | 3/1998 | Goss |
| 5,812,344 A | 9/1998 | Balakrishnan |
| 5,859,749 A | 1/1999 | Zarouri et al. |
| 5,865,978 A | 2/1999 | Cohen |
| 5,877,920 A | 3/1999 | Resh |
| 5,894,657 A | 4/1999 | Kanayama et al. |
| 5,912,787 A | 6/1999 | Khan et al. |
| 5,918,362 A | 7/1999 | Yamashita et al. |
| 6,002,650 A | 12/1999 | Kuribayaski et al. |
| 6,020,022 A | 2/2000 | Ejiri et al. |
| 6,071,056 A | 6/2000 | Hollowell |
| 6,130,863 A | 10/2000 | Wang et al. |
| 6,146,813 A | 11/2000 | Girard et al. |
| 6,266,869 B1 * | 7/2001 | Tracy et al. .................. 29/740 |
| 2002/0142102 A1 * | 10/2002 | Romine ...................... 427/421 |

* cited by examiner

APPARATUS FOR ASSEMBLING COMPONENTS

This is a divisional of application Ser. No. 09/250,823 filed on Feb. 17, 1999 U.S. Pat. No. 6,266,869.

FIELD OF THE INVENTION

The present invention relates generally to robotic manufacturing and in particular to apparatus and method for attaching a flexible circuit to a suspension used in the read/write head gimbal assembly of hard disk drives.

BACKGROUND OF THE PRESENT INVENTION

The hard disk drive is the device most predominantly used for long term memory storage in modern computer systems. In overview, a hard disk drive comprises a disk that is rotated at high speeds. The disk has a magnetic coating and selected areas of the coating can be magnetized with the application of a magnetic field. A "read/write" device, commonly called a head, is suspended above the disk and moved radially, that is, from the edge of the disk toward the center and back. Electric current is provided to the head which creates and applies a magnetic field to the disk as the head moves. Selective areas of the disk are preferentially magnetized as the magnetic field is applied to the disk. Each magnetized area consists of a north and south pole selectively oriented in one of two preferred directions. Magnetized areas having a north pole pointing in one of the two direction are designated as a "0" and in the other direction as a "1." In this way the binary language of computers consisting of zeroes and ones is assembled and data and programs, which comprise zeroes and ones in binary computer language, are stored on the hard disk.

The hard disk provides large amounts of storage capability at relatively low cost. In addition, as the technology continually matures, the storage density per unit of cost, that is, the quantity of data stored per dollar, is continuously increasing, as is the reliability of the hard disk and its related components, (collectively called the hard disk drive, hard drive, or disk drive) and the rate at which data can be transferred to and from the disk. That is, advancing hard disk technology is resulting in the storage of increasing amounts of information at decreasing unit costs. Yet, in spite of the rapid advance in storage technology, the technology continues to face cost pressures as competition in the marketplace intensifies and computer programs grow in size.

An exploded view of a flex circuit/suspension assembly is shown in FIG. 6, which illustrates several components including a csuspension A and a flex circuit B. It will be understood that the actual physical structures of these components may vary in configuration. Typically, the suspension A will include a base plate C, a radius (spring region) D, a loadbeam E, and a gimbal F. At least one tooling aperture G may be included. The flex circuit B may include a base H, which may be a synthetic material such as a polyimide, that supports typically a plurality of electrical traces or leads I of the flex circuit. In addition, any of the surface features of the suspension A and the flex circuit B, such as the loadpoint J of the suspension A or the cure holes K of the flex circuit B, can be designated an optical target or an alignment target for use in the process of assembling the flex circuit and the suspension to each other. Additionally, the suspension A and/or flex circuit B may include fiducials that are specifically placed thereon for imaging purposes during an assembly operation.

The components shown in FIG. 6 as well as all those associated with hard disk drives are small and continually decreasing in size. Consequently, any tolerance for misalignment of the components during the assembly process is also continuously decreasing while their susceptibility to damage during assembly is increasing.

Current disk drive assembly includes expensive, labor intensive processes, particularly the assembly of the flex circuit to the suspension assembly. The labor intensive nature of the assembly process has several consequences. First, the labor increases the final cost of the assembled suspension. Second, because of the heavy use of labor in the assembly, there is a meaningful quantity of handling of the components by the assembler, which increases the likelihood of damage to the components. Third, the assemblers are limited in both the precision and speed with which the flex circuits can be assembled to the suspensions. Fourth, even though human assemblers are used, the assembly process is quite tooling intensive. Finally, as the part geometries change as the technology advances, the costs also increase because of the need for new tooling in the assembly of the new parts; that is, the tooling used is either not adaptable or not readily adaptable to new part geometries.

Additional costs that are not included in calculation of the cost of the use of human assemblers are those of the consumer whose hard drive fails, perhaps due to damage to a component by a human assembler. Though data backups are always advised, such advice is often unheeded. When a hard drive fails the consumer may lose valuable data that is either not easily replaced or is replaced only at some cost in terms of time and effort, if not actual cash outlays.

Many of the foregoing deficiencies in the employment of human assemblers could be reduced or eliminated with a precision automated assembly apparatus and method for attaching flex circuits to suspensions. Automated assembly machines and methods should result in lower costs, reduced component handling and possible damage, and have greater flexibility to accommodate variations in component types, geometries and improved placement tolerances.

SUMMARY OF THE INVENTION

It is an object of the present invention to provide new and improved apparatus and methods that are not subject to the foregoing disadvantages.

It is another object of the present invention to provide an apparatus that can be used for the automated assembly of one or more component parts of a read/write head gimbal assembly to each other.

It is still another object of the present invention to provide a method for the assembly of one or more component parts of a read/write head gimbal assembly to each other.

The foregoing objects of the present invention are provided by an assembly system employing at least a robotic or automated assembly apparatus to manipulate the components to be assembled and at least a first vision alignment system to align the components prior to their assembly. An adhesive dispense system is provided to connect, attach or otherwise adhere the components together.

In a method in accord with the present invention, a plurality of component parts are assembled to each other. A source of the component parts is provided and the source is located relative to a global or absolute reference system. The components held by the source are then located relative to the global reference system based upon the determined location of the source. An adhesive is dispensed onto a first of the components. A second component is manipulated into an initial attachment position relative to the first position and the components are imaged by a second or local imaging system to establish their position relative to each other. The second component will be manipulated relative to the first based upon their calculated relative positions to position the second component at the desired attachment position and then will be lowered into engagement with the adhesive and the first component. The adhesive may then be at least partially cured if desired.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PREFERRED EMBODIMENT

Figure 1:
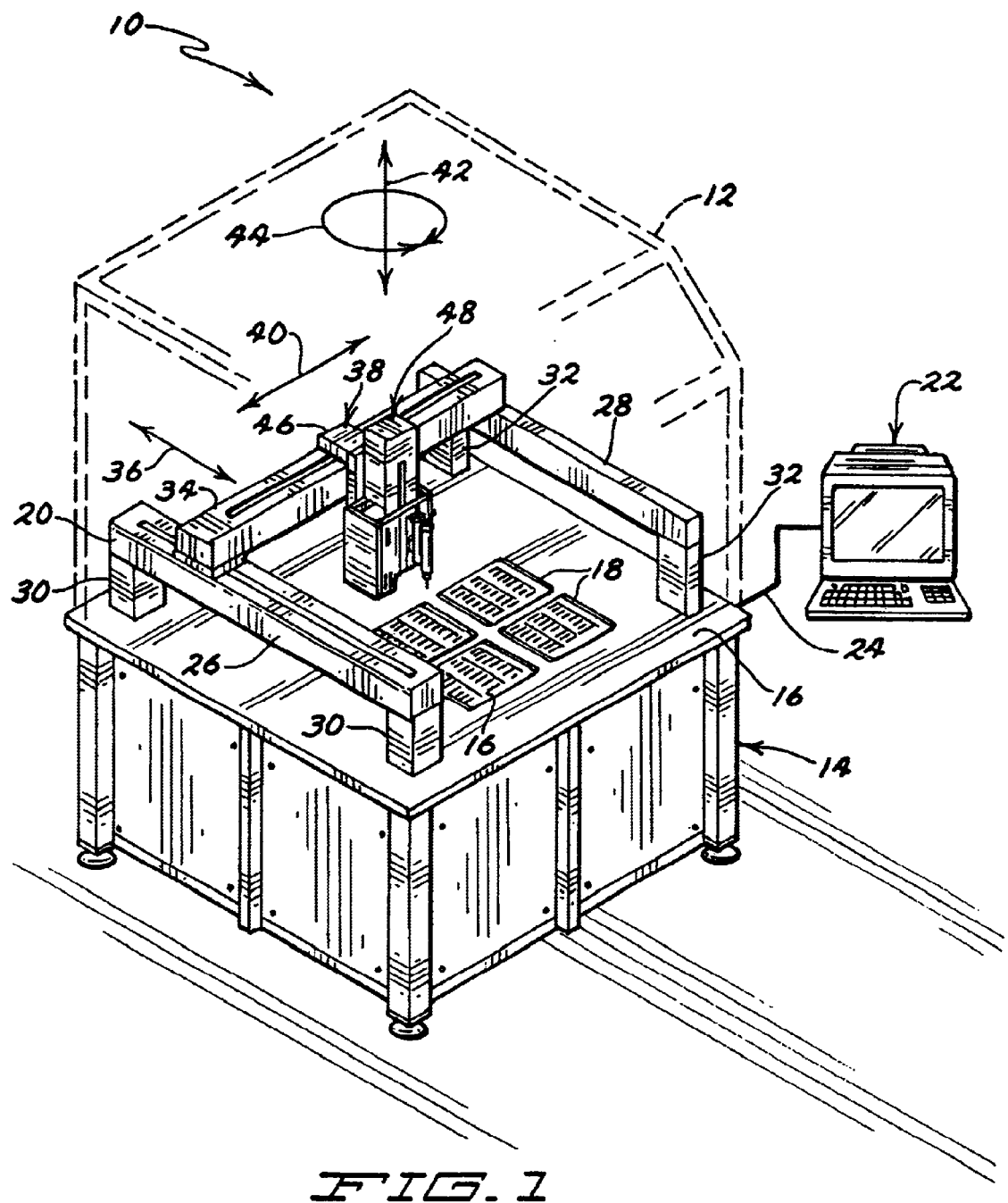
FIG. 1 illustrates an apparatus in accord with the present invention in a perspective overview.

An assembly apparatus 10 in accord with the present invention is shown in the Figures. Referring to FIG. 1, apparatus 10 includes a cover 12, shown in phantom, and a cabinet 14. Cover 12 may be hingeably attached to the cabinet 14. Cabinet 14 supplies the support structure for the assembly apparatus to be described in greater detail hereafter. Cabinet 14 may include a table 16 that supports a plurality of component trays 16 and 18 at predetermined locations. Trays 16 and trays 18 hold components to be attached or otherwise connected to each other, for example, flex circuits and suspensions. Cabinet 14 also supports an xyz and θ robot 20 that is controlled by an appropriately programmed computer 22 or other appropriate device over a line 24. Robot 20 is capable of manipulating parts in an orthogonal xyz coordinate system rotationally about the z axis, thus providing manipulation in the θ angular direction.

It will be understood by those in the art that both trays 16 and 18 could be placed in any desired arrangement relative to robot 20 and that the components contained therein could also be arranged as desired within the trays. In any event computer 22 will be programmed with the necessary information as to the relative locations of the trays and the components therein.

The particular robotic system or apparatus 20 shown in the Figure is of the type presently manufactured by Zmation, Inc. of Portland, Oreg., and additional details concerning its construction and operation can be obtained from the manufacturer. Other manufacturers of similar robotic apparatus include Anorad Corporation of Hauppage, N.Y.

Robot 20 is movable in a plurality of rectangular coordinate axes and in at least one angular or rotational degree of freedom, as will be described hereafter. In addition, as is known in robotic assembly equipment, robot 20, could, if desired, include the ability to manipulate components in additional degrees of freedom, that is angularly.

Robot 20 includes a pair of horizontal rails 26, 28 each supported by a pair of posts 30, 32, respectively. A transverse rail 34 is movable along rails 26 and 28 in the direction indicated by double-headed arrow 36. Thus, rail 34 is movable in the X direction or along the X axis and is sometimes referred to in the art as the X stage.

Rail 34 supports a manipulator arm 38 that is transversely movable relative to the rails 26 and 28 along transverse rail 34 in the direction indicated by double headed arrow 40. Thus, arm 38 is movable in the Y direction or along the Y axis and is sometimes referred to in the art as the Y stage.

In addition, portions of the manipulator arm 38 will also be movable in the direction of double headed arrow 42. This is the Z direction or Z axis. Portions of the arm 38 are also movable in an angular direction as shown by double headed arrow 44.

Collectively, it will be understood that arrows 36, 40, and 42 define a rectangular or xyz axis coordinate system and that the manipulator arm portions to be described hereafter are rotatable about the Z axis as noted earlier.

Various devices are known in the art for providing movement in a robot system such as that illustrated here. For example, movement along each axis could be provided by an appropriate device for providing linear motion, such as linear servo motors or other linear actuator mechanisms, such as ball screw or stepper motors, for example. In the preferred embodiment, motion in the vertical or upright direction will be provided by a linear voice coil motor with voltage feedback.

To provide the ability to control the robot 20 and position it where desired for the assembly operations, each motion providing device will include the appropriate position feedback system for providing position information to the controller or computer 22. Movement in the angular or θ direction can be provided by a rotary servo motor with an encoder providing the desired feedback. As with the movement in the rectangular coordinate system, the angular movement could be provided with alternative devices including any other known type of rotary actuated stage mechanism capable of providing the desired motion at the desired accuracy. Once again, the rotary motion mechanism will provide controller or computer 22 with the appropriate position information.

Manipulator arm 38 includes as shown a load support portion 46 and an upright portion 48 elongated in the upright direction, though this configuration is not critical to the present invention. Portions 46 and 48 provide a support for the tools and instruments used to attach the components to be assembled to each other. These tools and instruments include a global vision system, an adhesive dispense system, a vacuum collet, an adhesive tack system, and a local vision system, each to be described in greater detail hereafter.

Figure 2:
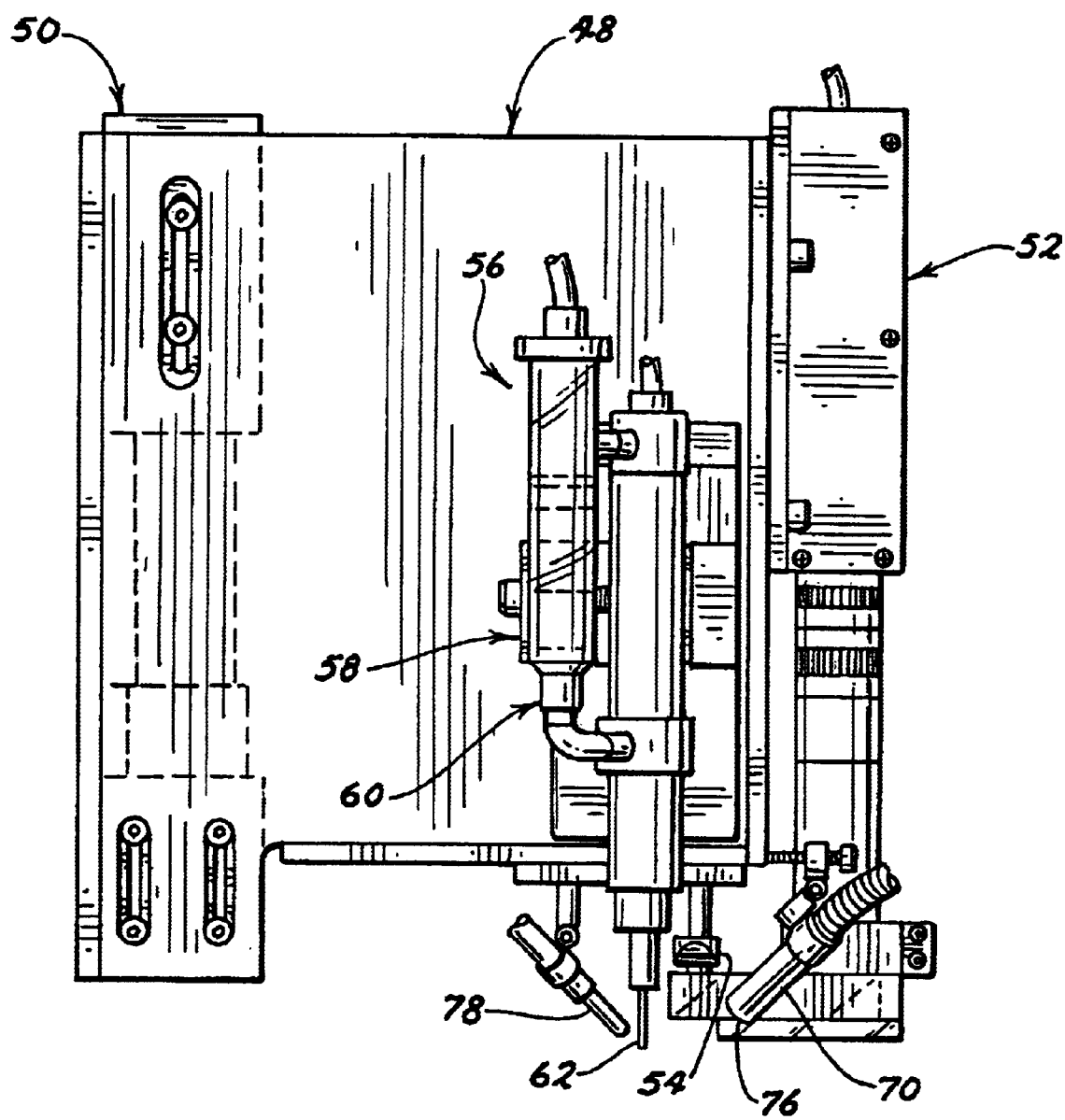
FIG. 2 shows the manipulator arm of FIG. 1 in a front elevation view.
Figure 3:
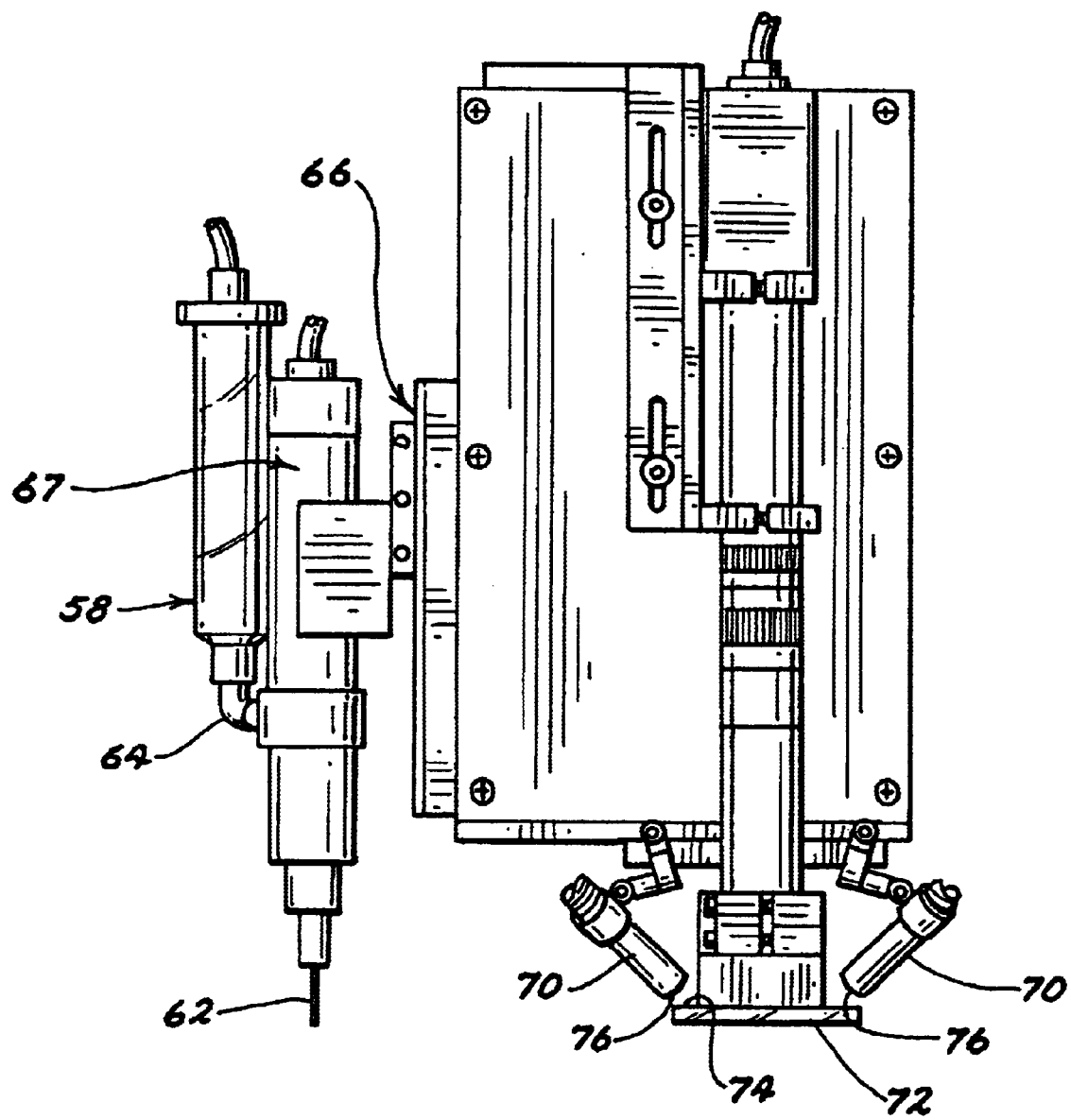
FIG. 3 depicts the manipulator arm of FIG. 1 in a side elevation view.
Figure 4:
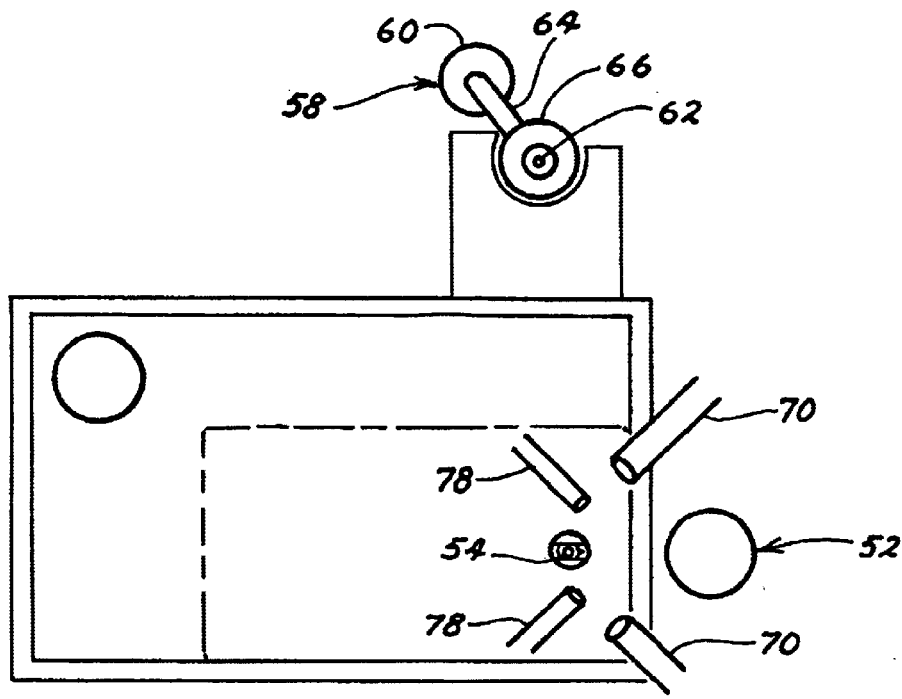
FIG. 4 illustrates the light source of FIGS. 1–4 in a top plan view.

Referring now to FIGS. 2–4, the manipulator arm 38 will be described in additional detail. Arm 38 includes a global vision imaging system (GVS) 50 that includes in a preferred embodiment a charged couple device (CCD), camera, a lighting system, and the appropriate lens and positioning algorithms. GVS 50 is useful for globally or grossly positioning the arm 38 relative to each of the trays 16 and 18. The GVS 50 will also determine the position of the trays 16 and 18 relative to an absolute coordinate system defined by the position feedback systems used with the XY stages. A particular advantage of using the GVS 50 is that precise positioning of the component trays 16 and 18 within the apparatus 10 is not required. In addition, the GVS 50 will take into account any variations in the manufacturing tolerances of the component trays 16 and 18. That is, even assuming that the trays 16 and 18 were precisely positioned relative to the apparatus 10, manufacturing tolerances in the trays 16 and 18 could result in the actual components being located at differing locations. These position differences in the component locations are thus accounted for by the GVS 50.

Also included is a local vision system (LVS) 52. As with the GVS 50, LVS 52 may include a CCD camera, a lens system, a lighting system, and vision processing tools/algorithms used by the appropriate controller or computer 22 to aid in the precision positioning of the arm 38. The CCD camera is preferably mounted to the arm 38 so as to be movable in the X and Y directions. Where the GVS 50 was used to grossly position the arm 38 relative to the component trays and thus the absolute coordinate system defined by the position feedback system, the LVS is provided for locating the arm 38 relative to actual components to be assembled to each other. Thus, the LVS 52 can be operated to image the components, such as a flex circuit and a suspension. These images can then be used by the computer 22 or other controller as desired, each supplied with the appropriate vision processing software, to control the movement of the robot 20 in the X, Y and θ stages. In this way then, the robot 20 can be precisely positioned with respect to first one component, such as a flex circuit, and then relative to a second (or third or more components if multiple components are being assembled to each other) in order to assemble the components to each other. Preferably, the absolute position relative to the global coordinate system will not be used to precisely position the arm 38 relative to the components. Rather, the position of the components themselves relative to each other will provide the position information used for the precision alignment of the components relative to each other.

FIGS. 2–3 further illustrate a component manipulation system. The present invention contemplates the use of a vacuum system to pick up and move the components for assembly. The present invention utilizes a vacuum collet 54 mounted for movement along all four stages, that is the X, Y, Z, and θ stages. The use of vacuum component manipulation systems for robotic assembly are well known and will not be expounded upon here. Suffice it to say that such systems utilize a precisely configured tool head that is maneuvered into position relative to a component, the tool head is carefully applied to the component and a vacuum applied to the tool head. In this way, the component is held to the tool head by the differential air pressure between the atmosphere and the vacuum inside the tool head. The tool head is then maneuvered along with the component to the next stage in the assembly process. In the present invention, the vacuum collet 54 will be used to first pick up a flex circuit from either tray 16 or 18, depending upon the programming of the apparatus 10. The pick up of the flex circuit will be accomplished by the movement of arm 38 using first the X and Y stages to position the arm 38 above the flex circuit and using the Z and θ stages to lower the vacuum collet shaft (not shown) and the attached collet 54 such that the collet 54 is in position to apply the vacuum. The vacuum collet will then be moved to a position above and relative to the suspension to which it will be bonded using the X, and/or Y and/or θ stages. The LVS will then be used to position the flex circuit precisely relative to the suspension using the X and/or Y and/or Z and/or θ stages. The parts will then be attached or otherwise fastened to each other. Where the apparatus 10 is provided with the ability to identify damaged or defective parts, the vacuum collet 54 may be used for additional tasks such as removing such parts from the trays 16 and 18.

Also shown in the Figures is an adhesive dispense system 56. The adhesive dispense system 56 will include at least one adhesive dispensing unit, such as unit 58 as shown in the Figure, mounted to the manipulator arm portion 48. Unit 58 includes a syringe or other adhesive reservoir 60 as well as a dispensing tip or needle 62. The reservoir 60 will be connected to the tip 62 via a hose or other conduit or channel 64. The unit 58 will be movable preferably in the X and Y direction using the X and Y Stages, as well as in the Z direction. In the preferred embodiment of the present invention, such Z movement will be accomplished with a separate actuator such as a pneumatic cylinder 66. In the preferred embodiment, the adhesive dispense units 58 may comprise a needle valve 67, which includes a valve movable in the Z direction for dispensing of the adhesive. Alternatively, they can also comprise spool valves, time-pressure valves, positive displacement valves, auger valves or any other type of adhesive dispensing mechanism.

The present invention further includes an improved lighting system for illumination of the various components to provide a more effective imaging of the component parts, particularly when using LVS 52. Referring now to FIGS. 2–4, the improved lighting system 68 will be described. The lighting system 68 includes at least one and preferably a plurality of illumination sources 70. Preferably, a single light source is used to provide illumination to a bifurcated optical fiber so as to provide uniform, nearly equal illumination from at least two directions to reduce shadowing. Sources 70 direct their light onto a diffuser 72. To provide the high quality illumination needed to illuminate the trays and the components, the light from the source 70 should preferably be directed at an angle of 15°, and within the range of 0° to 30° with respect to the diffuser surface 74, which should be substantially planar. Additionally, the light exit 76 from source 70 should be disposed at a distance within the range of about 5 to about 40 mm.

The present invention further includes an ultraviolet or UV tack system for at least partially curing the adhesive applied by adhesive dispense unit 58. The UV tack system 78, which includes an ultraviolet light source, provides a "quick tack" of the components to each other, here the flex circuit to the suspension, after application of the adhesive and attachment of the component parts one to the other. The quick tack provided by the system 78 substantially prevents the damaging loss of the precision positioning achieved by the combined operation of the vision systems and the manipulator arm 38, thus assuring that the relative placement of the components (the flex circuit relative to the suspension, for example) does not change before the adhesive is fully cured in a curing oven later in the assembly process. Dependent upon a number of factors, such as but not limited to the specific adhesive being used and the component geometry, the UV quick tack step may or may not be required.

Figure 5:
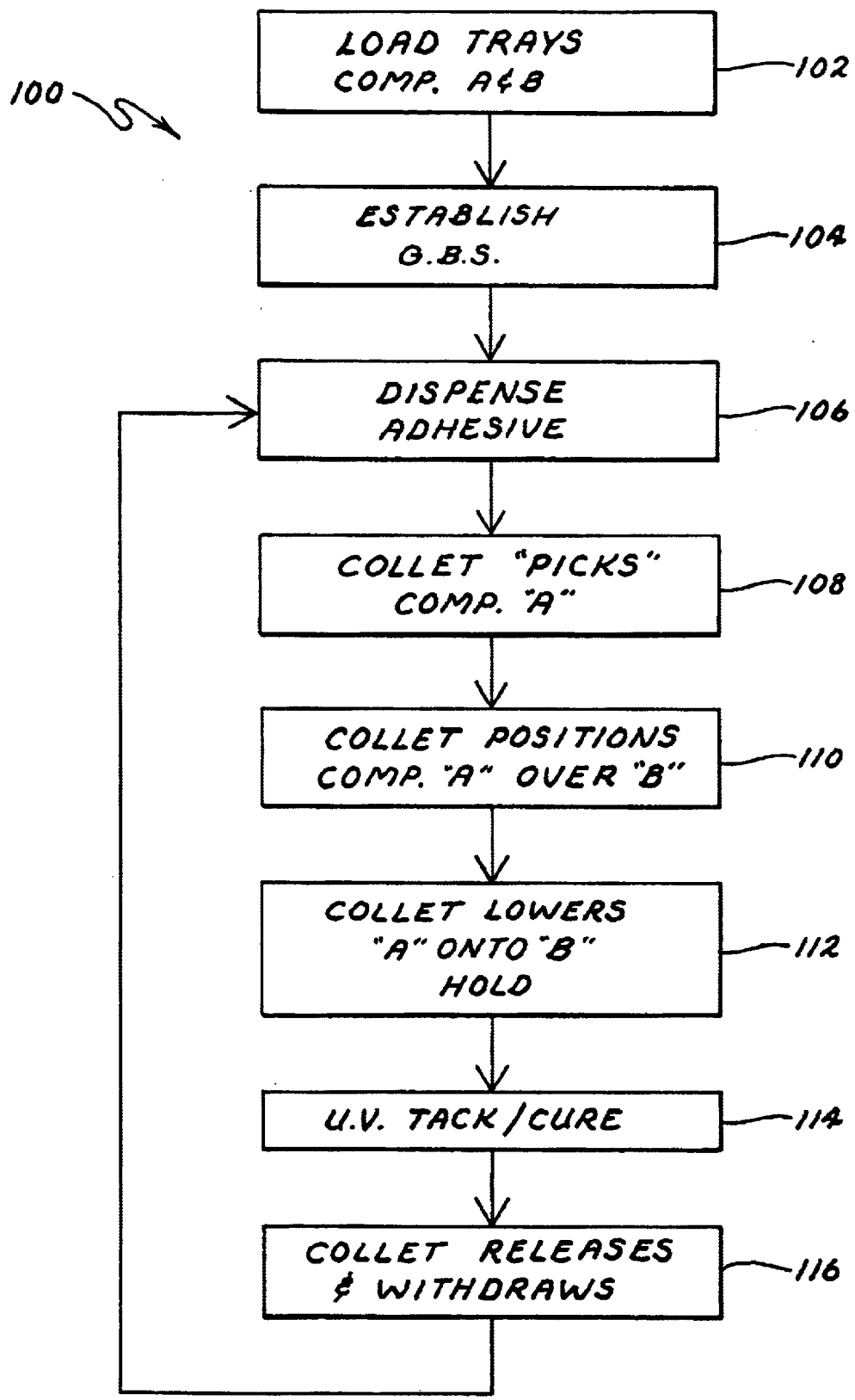
FIG. 5 is a process flow chart of a method in accord with the present invention.

Having previously described an apparatus useful in accord with the present invention, a method of assembling component parts in accord with the present invention will now be described. Referring to FIG. 5, then, a flow chart illustrates a method 100 for assembling component parts together. Thus, as seen in the figure, method 100 includes the step 102 of loading trays, such as trays 16 and 18, into the apparatus 10. The trays 16 and 18 will be pre-loaded with the components, indicated by the "A" and "B" in step 102, to be assembled together.

The use of pre-loaded trays has several advantages over the prior art assembly using human operators. First and foremost is that the handling of the components by human operators is eliminated. This can eliminate several possible sources of component failure, including, but not limited to, damage directly caused by the handling of the component by the human operator, contamination of the components, and damage caused by electrostatic discharge. In a preferred embodiment of the present invention, the trays would typically include the requisite numbers of components such that new trays would be installed and completed trays would be removed at the same time to reduce the down time on the apparatus 10. The trays could be loaded by operators or automated load stations. Preferably, the apparatus 10 will include apparatus for clamping or otherwise securing of the trays such that the trays can not be located in the incorrect orientation or location. This may be accomplished by a vacuum or mechanical clamp. The employment of the trays or some other similar apparatus to "rough position" the components reduces the amount of handling, the need for other tooling currently used in the manual assembly of such devices, and the use of the global vision system to more precisely align the parts prior to assembly.

Following loading of the trays, the apparatus 10 will then, if it has not already done so, establish the global coordinate system (GBS) as at 104 as determined by the data provided by the position feedback mechanisms of the X and Y stages. Once the global coordinate has been established, it may be used to precisely locate the trays relative thereto.

The establishment of the GBS is accomplished in the preferred embodiment through the use of glass scale encoders attached to the linear servos that serve as actuators for the X and Y stages. Those skilled in the art will recognize that the use of such information enables the apparatus 10 to establish a coordinate system with an origin defined accordingly and to provide for the movement of the manipulator arm 38 to precise points (x,y) as determined relative to the origin (0,0) located according to the established GBS. For example, the arm 38 could be moved to a point (38, 88) which would be 38 units in the positive x direction and 88 units in the positive y direction. The units of movement could be units of length or encoder units or whatever unit is selected for use.

After the component trays have been loaded into the apparatus 10, the GVS along with the arm 38 will be moved to predefined or predetermined initial locations relative to the GBS. The predefined initial position is located so as to position the GVS relatively near the trays 16 and 18 such that it is able to image and locate a predetermined number, preferably two, of optical targets or fiducials located thereon. By determining the location of the fiducials the location of the trays can be determined. To determine the position of the fiducials relative to the GBS, the GVS will image the fiducials and then use vision processing tools and/or algorithms to precisely locate the fiducials. Thus, locating the fiducials will determine the tray positions relative to the X, Y, and θ directions. Knowing the tray locations in turn locates the positions of the components within the trays since the locations of the components within the tray relative to the fiducials will also be known. Thus, the component cavities holding components such as flex circuits and suspensions, will now be located and labeled as to their respective row number and column number in their respective trays, and each of these (row, column) labels will have a precise X and Y (X,Y) coordinate associated with it. That is, each tray may include cavities or receptacles of a predetermined configuration where the components reside. Locating the trays relative to the GBS with the GVS will thus locate the cavities or receptacles and, therefore, the components.

Once the GVS has isolated each component part as to its location relative to the GBS, the parts can be bonded to each other. In summary, the adhesive will be dispensed onto one part, the second part will be picked up and placed on the first part, the UV quick tack will be applied to tack the parts together, and the process will be repeated.

In greater detail, the manipulator arm 38 will be moved in the X and Y directions to position the adhesive dispense unit 56 above the component, such as a suspension. The z actuator 66 for the needle tip 62 will be actuated to lower the needle tip to the proper height above the component for the dispensing of the adhesive and the adhesive will be dispensed as indicated at 106 using the needle valve 67 in a controlled volume at a controlled rate and in a controlled pattern, all of which may vary according to geometry and specifications of the particular components being assembled.

Preferably, the LVS is not used during the adhesive dispense step and the adhesive is dispensed based upon the location of the cavity as determined by the GVS. The LVS can be used if desired to position the needle tip 62 at the desired location, but doing so will result in an increase in the cycle time, and the time to complete an assembly.

Following the dispensing of the adhesive, the component to be bonded to the first component will be picked up by the vacuum collet 54 as at 108 where it is indicated that the collet picks component A. To accomplish this arm 38 will be moved over to the other component tray, such as the flex circuit tray, and the vacuum collet 54 will be positioned over the component to be bonded to the component in the first tray. The Z stage actuator will then lower the collet 54 as determined by the feedback system associated with the actuator steps with a precise, predetermined force relative to the component, coming into sufficient contact with the component such that upon engaging the vacuum the component will be held by the differential air pressure to the collet. The Z stage actuator will be actuated again and the collet and attached component will be lifted or picked up. The picking up of the second component can be a "blind pick" based upon the calculated position of the component to be picked up, or one of the vision systems can be used to precisely position the collet in the X, Y, and θ directions relative to the component. Once again, to reduce assembly cycle time it is preferred that the pick be a blind pick.

The arm 38 then moves to position the picked component "A" over the component "B" as indicated at 110. As an example of this step, the arm 38 is moved so as to position the collet 54 holding the flex circuit over the suspension upon which adhesive has been dispensed. While this may be the same component upon which adhesive has just been dispensed, it need not necessarily be the case. For example, it may be desirous to allow the adhesive to cure for a predetermined period of time before the parts are bonded to each other, in which case, a second component could be bonded to a first component after some period of cure time. For example, processing could begin with application of adhesive to a plurality of components and then the alternating process of adhesive application and part bonding could be conducted, with the second component being bonded to the first component having adhesive applied for the longest time.

Figure 6:
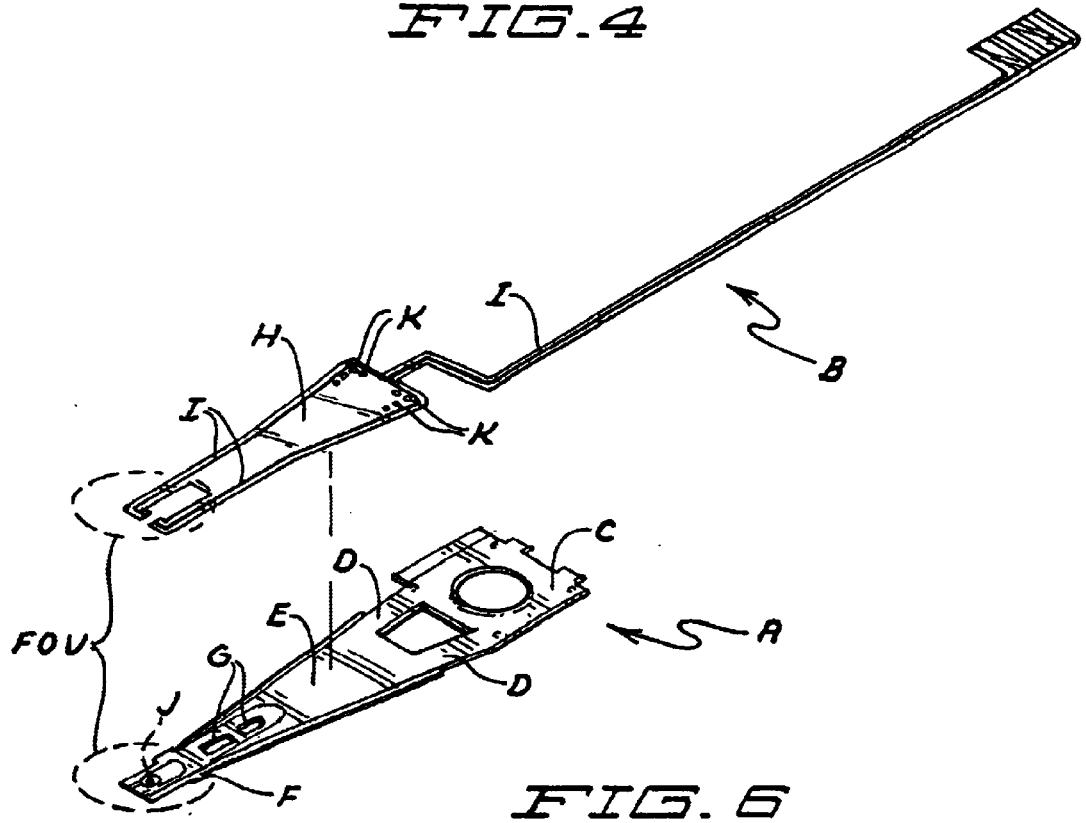
FIG. 6 illustrates a flex circuit/suspension of the type that can be assembled with the present invention.

After the collet 54 is moved over the component with the adhesive applied to it, both components will be within the field of view, shown generally and not to scale as dotted line circles FOV in FIG. 6 by way of illustration only, of the LVS 52 and within the same depth of focus. The LVS will image the components, and using fiducials or optical targets on the component parts will determine their position relative to each other using vison tools and or software processing algorithms. In addition, both components will be within the same depth of focus, which thereby enables the LVS and GVS cameras to stay fixed relative to each other. Because the LVS is fixed relative to the collet, mechanical errors arising from camera movement are not introduced into the calculation of the relative component positions. Once the precise relative positions are identified, the collet 38 will be positioned using the X, Y, and θ stages to align the first and second components for bonding. This positioning may be done using a single image capture, position calculation, and movement of the arm 38, or it may be repeapted several times to achieve the desired placement accuracy. The number of iterations of imaging, calculation, and movement can be dependant on such factors as stage quality, that is, movement precision, specifications required, vibration in the production plant, etc. The relative component position determination can be accomplished in different ways according to several known several methods; generally, the relative positions will be calculated using algebra and trigonometry in combination with the precise dimensions of the components, which will have previously been entered into the computer on a part specific basis.

In some assembly procedures, the step of aligning the component parts may focus on alignment of the fiducials or optical targets. In other assembly procedures, computer 22 may have been programmed with the locations of alignment targets out of the field of view of the LVS. In this latter situation, the alignment of those out of view alignment targets will be made by calculating the relative locations of those alignment targets using information concerning the parts previously programmed into the computer 22.

Preferably, the present method utilizes a small field of view in the LVS to increase the accuracy and precision of the procedure. That is, in a preferred embodiment a field of view of 2 mm by 2 mm in size is utilized. Preferably, using presently available optical equipment the field of view will be less than about 4 mm by about 4 mm. The small field of view also enables the items of interest to be zoomed in on as desired. The small field of view, however, means that the desired alignment targets may not be within the field of view, however, thereby requiring an alignment calculation to be made as just described above.

Once the proper relative position is achieved, the collet 54 will be lowered along with the component using the Z stage actuator into a bonding engagement with the first component as at 112. That is, the Z stage actuator will lower the collet 54 and the flex circuit with a known z-force to provide a precisely located, controlled placement that reduces the chance of misaligned components as well as the damage from an uncontrolled or lesser controlled application of force between the parts by the human operator. The UV tack can be activated at 114 to provide a quick cure or tack of the adhesive. The vacuum will be released then from the collet such that the component is no longer held by the collet 54 and the collet will be raised by the Z stage actuator as at 116. The cycle will then be repeated with the dispensing of adhesive at 106 onto another component. The cycle just described will also be repeated until each of the components in the tray have been addressed by the controller or computer 22. The trays can then be removed and new trays filled with components placed within the apparatus 10 for assembly.

Application of the vision systems in the present invention provides superior capabilities in terms of placement or positioning of the components compared to existing manual methods which are dependent upon on the precision—or lack thereof—of human eyes and/or fixed/hard tooling alignment mechanisms. Use of the vision systems also provides superior flexibility. That is, when a new part geometry is used with the present invention, very few changes will need to be made to the present invention. For example, the principal changes will occur in the software, though different trays and a new vacuum collet may be needed to conform to the new part geometry. In contrast, when part geometries change at present, new tools must be constructed to accommodate the different geometries.

The vision systems can also be used to inspect for and identify defective components and when found, to dispose of them before they are bonded to a non-defective component and ultimately delivered to a consumer. The automated nature of the process also facilitates the collection and storage of operational data that can be used to monitor the operation of the system, the number of defective components, the precision of the alignment, and other information as specified and desired.

In some embodiments of the present invention, the two components may need to be "interleaved" to complete the assembly. For example, in addition to the flex circuit being lowered to the suspension, the X and/or Y and/or θ stage would also be used to lower and mesh or interleave the flex circuit with the suspension sequentially or simultaneously.

In other embodiments of the present invention, the electrical leads on the flex circuit may need to be bent to a certain geometry before and/or after the bonding process to the suspension. This is also something that the flexible process described herein allows for. The bending of the electrical leads could be accomplished by the addition of another tool on the arm 38, or possibly by the collet 54 itself. In still further embodiments, the method of transporting the components through the process described may be a conveyor type system. In still another embodiment of the present invention the suspension could be brought to the flex circuit rather than bringing the flex circuit to the suspension as hereinbefore described.

As shown, rail 34 is disposed above rails 26 and 28, though as is known in the art, this relative position is not critical to the functioning of such robots. Thus, rail 34 could be disposed below or at an elevation substantially equal to rails 26 or 28.

While a specific robotic assembly apparatus 20 has been described above, it will be understood and appreciated by those skilled in the art that other robotic systems capable of performing the aforementioned motions and functions could be used in lieu of the described apparatus 20 with equal facility.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. An apparatus for assembling at least a first component to a second component, said apparatus comprising:

a robotic assembly apparatus including a manipulator arm movable in xyz and θ directions;

a global vision system comprising a camera, said global vision system being provided for locating the first component relative to a global reference system;

a vacuum collet attached to said manipulator arm for placing the first component in an attachment position relative to the second component wherein the first and second components are disposed substantially one above the other;

an adhesive dispense system attached to said manipulator arm for dispensing adhesive onto at least a selected one of said first and second components; and a local vision system attached to said manipulator arm, said local vision system being provided for imaging said first and second components when said first and second components are iii said attachment position.

2. The apparatus of claim 1 wherein said local vision system includes a local vision lighting system, said local vision lighting system comprising:

a diffuser plate; and a pair of light sources directed at said diffuser plate.

3. The apparatus of claim 2 wherein said light sources are directed at said diffuser plate from substantially opposite directions.

4. The apparatus of claim 3 wherein said diffuser plate has a substantially surface and light sources direct light at said diffuser stave at an angle in the range of about 0° to about 30° with respect to said diffuser surface.

5. The apparatus of claim 4 wherein said light sources direct light at said diffuser surface at an angle of about 15° with respect to said diffuser surface.

6. The apparatus of claim 4 wherein said light sources are disposed at a distance from said diffuser surface within a range of about 5 mm to about 40 mm.

7. The apparatus of claim 2 wherein said diffuser plate has a substantially planar surface and said light sources direct light at said diffuser surface at an angle in the range of about 0° to about 30° with respect to said diffuser surface.

8. The apparatus of claim 7 wherein said light sources direct light at said diffuser surface at an angle of about 15° with respect to said diffuser surface.

9. The apparatus of claim 7 wherein said light sources are disposed at a distance from said diffuser surface within a range of about 5 mm to about 40 mm.

10. The apparatus of claim 1 and further including means for at least partially curing dispensed adhesive.

11. The apparatus of claim 10 wherein said means for at least partially curing comprises an ultraviolet light source.

* * * * *

UNITED STATES PATENT AND TRADEMARK OFFICE
CERTIFICATE OF CORRECTION

PATENT NO. : 6,779,252 B2  Page 1 of 1
DATED : August 24, 2004
INVENTOR(S) : Joseph Patrick Tracy et al.

It is certified that error appears in the above-identified patent and that said Letters Patent is hereby corrected as shown below:

<u>Title page</u>,
Item [57], ABSTRACT,
Lines 7-20, delete "In a method in accordance with the present invention for assembling components, a source of the components is provided is located relative to a global reference system. The components held by the source are then located relative to the global reference system based upon the determined location of the source. An adhesive is dispensed onto a first of the components and a second component is manipulated into an initial attachment position relative to the first component. The components are imaged by a local imaging system to establish their position relative to each other and the second component is moved into a desired attachment position and then moved into engagement with the adhesive and the first component. The adhesive may then be at least partially cured if desired."

<u>Column 11</u>,
Line 9, delete "iii" and insert in place thereof -- in --.
Line 19, delete "surface and" and insert in place thereof -- planar surface and said --.
Line 20, delete "stave" and insert in place thereof -- surface --.

Signed and Sealed this

Eighth Day of February, 2005

JON W. DUDAS
*Director of the United States Patent and Trademark Office*